US010626675B2

(12) United States Patent
Ross

(10) Patent No.: US 10,626,675 B2
(45) Date of Patent: Apr. 21, 2020

(54) BEARING SECTION FOR A POSITIVE DISPLACEMENT MUD MOTOR FOR USE IN DIRECTIONAL EARTH DRILLING

(71) Applicant: Tony Ross, Spencer, NY (US)

(72) Inventor: Tony Ross, Spencer, NY (US)

(*) Notice: Subject to any disclaimer, the term of this patent is extended or adjusted under 35 U.S.C. 154(b) by 0 days.

(21) Appl. No.: 15/774,405

(22) PCT Filed: Nov. 16, 2016

(86) PCT No.: PCT/US2016/062230
§ 371 (c)(1),
(2) Date: May 8, 2018

(87) PCT Pub. No.: WO2017/087490
PCT Pub. Date: May 26, 2017

(65) Prior Publication Data
US 2018/0328111 A1 Nov. 15, 2018

Related U.S. Application Data

(60) Provisional application No. 62/256,793, filed on Nov. 18, 2015.

(51) Int. Cl.
E21B 7/06 (2006.01)
E21B 4/00 (2006.01)
E21B 17/20 (2006.01)
E21B 7/10 (2006.01)
E21B 47/01 (2012.01)
E21B 4/02 (2006.01)
E21B 44/00 (2006.01)
E21B 47/00 (2012.01)
F16H 35/00 (2006.01)

(52) U.S. Cl.
CPC .............. E21B 7/068 (2013.01); E21B 4/003 (2013.01); E21B 4/006 (2013.01); E21B 4/02 (2013.01); E21B 7/062 (2013.01); E21B 7/10 (2013.01); E21B 17/20 (2013.01); E21B 44/005 (2013.01); E21B 47/00 (2013.01); E21B 47/01 (2013.01); F16H 35/00 (2013.01); F16H 2035/001 (2013.01)

(58) Field of Classification Search
CPC .................................. E21B 7/06; E21B 7/068
See application file for complete search history.

(56) References Cited

U.S. PATENT DOCUMENTS

| 3,667,556 | A  | 6/1972 | Henderson |
|-----------|----|--------|-----------|
| 6,234,259 | B1 | 5/2001 | Kuckes et al. |
| 2002/0007969 | A1 | 1/2002 | Head et al. |
| 2006/0157278 | A1 | 7/2006 | Dolgin et al. |
| 2014/0048334 | A1 | 2/2014 | Pabon et al. |

OTHER PUBLICATIONS

International Search Report for PCT/US2016/062230 dated Feb. 7, 2017.

Primary Examiner — Kristyn A Hall
(74) Attorney, Agent, or Firm — Brown & Michaels, PC

(57) ABSTRACT

A bearing section for a positive displacement mud motor for directional drilling in which the deflection of the drill bit is remotely adjusted by bending the drive sub using an offset flex drive mechanism to adjust between desired settings. The bearing section is adjustable from the surface without the need for trips of the bottom hole assembly to the surface.

16 Claims, 7 Drawing Sheets

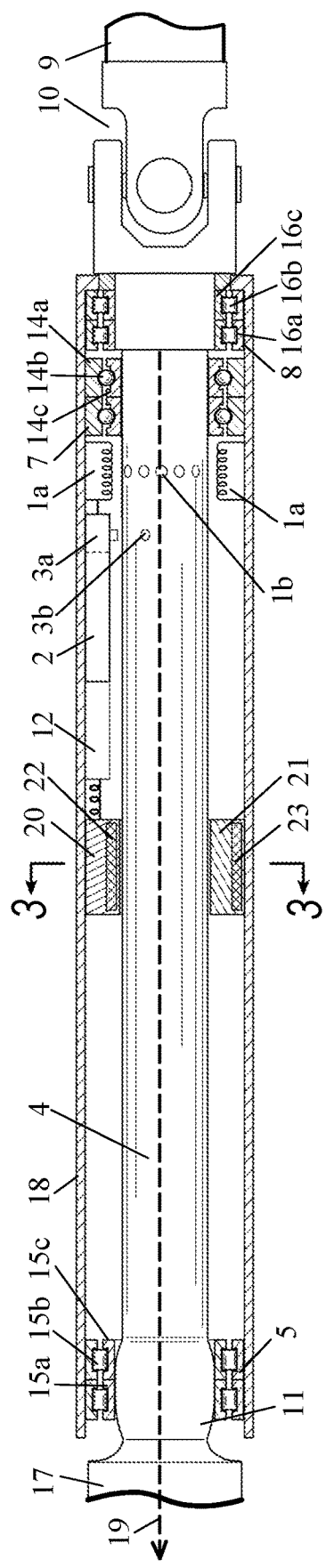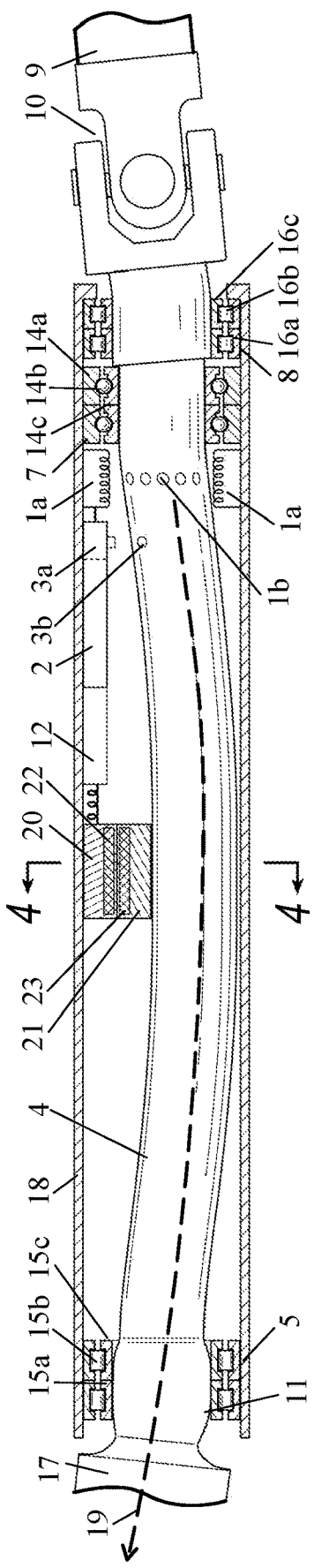

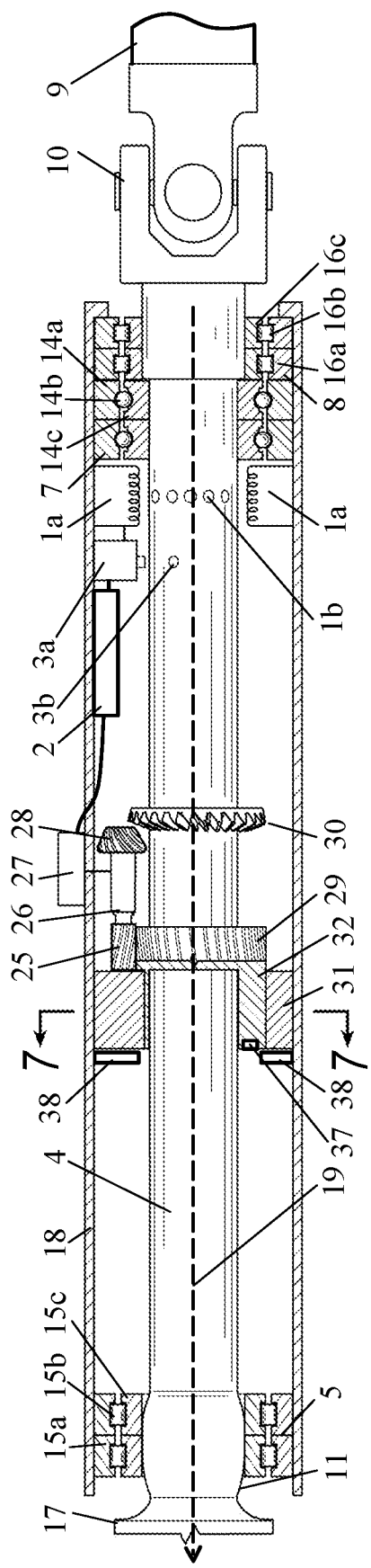
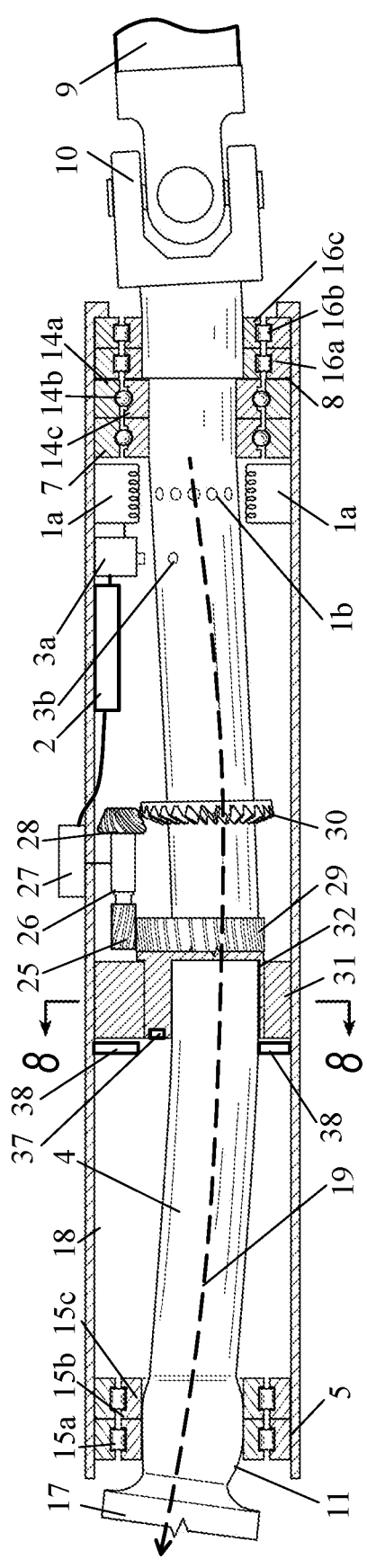
Fig. 5
Fig. 6

Fig. 12a
Prior Art
Fig. 12b
Prior Art
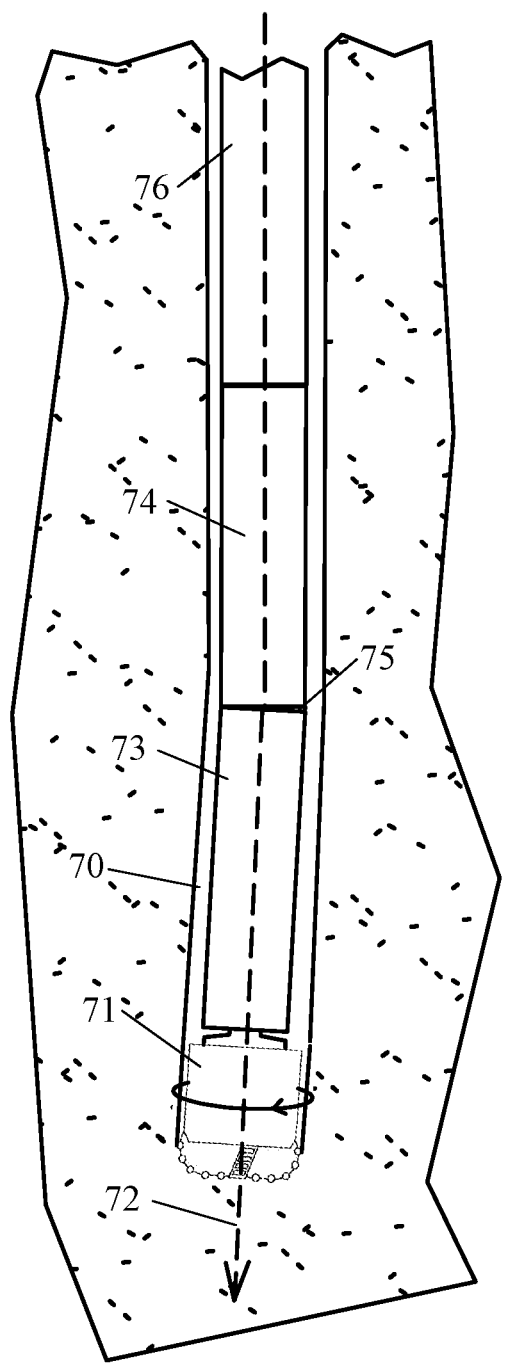
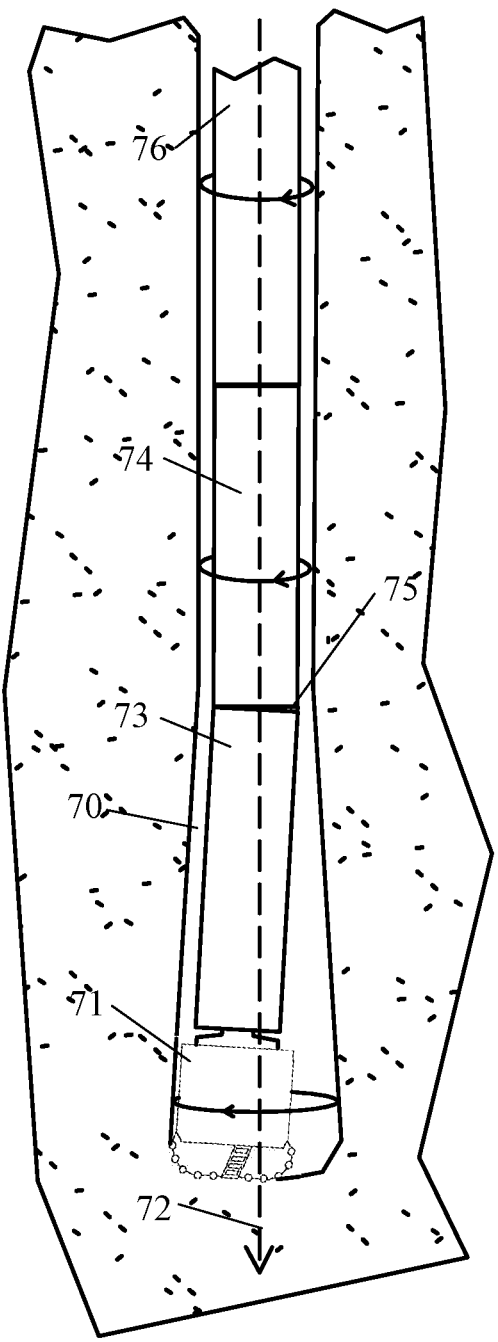

BEARING SECTION FOR A POSITIVE DISPLACEMENT MUD MOTOR FOR USE IN DIRECTIONAL EARTH DRILLING

REFERENCE TO RELATED APPLICATIONS

This application claims one or more inventions which were disclosed in Provisional Application No. 62/256,793, filed Nov. 18, 2015, entitled "POSITIVE DISPLACEMENT MUD MOTOR FOR THE USE OF DIRECTIONAL EARTH DRILLING". The benefit under 35 USC § 119(e) of the United States provisional application is hereby claimed, and the aforementioned application is hereby incorporated herein by reference.

BACKGROUND OF THE INVENTION

Field of the Invention

The invention pertains to the field of positive displacement mud motors. More particularly, the invention pertains to a remotely adjustable bearing section for a positive displacement mud motor for the use of directional earth drilling.

Description of Related Art

In the act of earth drilling there are two standard types of drilling, drilling a straight hole, often a vertical hole, which is commonly referred to as performance drilling. The other type of drilling is called directional drilling, which is when the path of the borehole needs to deviate from straight by some degree. The amount of deviation of the borehole varies widely and the degree from deviation from straight can be different over the course of the borehole.

FIGS. 12a and 12b show a prior art apparatus in use in a wellbore 70. The apparatus has a drill string 76 made up of pipe segments leading up to the surface which can be rotated and moved forward by a drill rig at the surface. A positive displacement mud motor, made up of a power section 74 and a bearing section 73 separated by an adjustable section 75, is mounted on the bottom end of the drill string 76. The power section 74 has a hydraulic motor formed by a fixed stator and a rotor which is powered by the flow of drilling fluid ("mud") which is pumped down the drill string 76 from the surface.

The output of the motor in the power section 74 is coupled to a shaft in the bearing section 73 by a universal joint which permits the motor to drive the drill bit 71 on the end of the bearing section 73 despite the bend of the adjustable section 75, which is described below. The mud flows from the power section 74 through the bearing section 73, out around the drill bit 71, and then flows back up the borehole 70 to carry the cuttings back up to the surface for disposal.

The drilling apparatus shown in FIGS. 12a and 12b can be operated in two modes—FIG. 12a shows "slide mode", and FIG. 12b shows "rotation mode".

In the "slide mode" shown in FIG. 12a, the drill string 76 is held in fixed position rotationally. Drilling mud is pumped down the drill string 76 to power the mud motor and rotate the drill bit 71. As the drill bit 71 rotates and drills away the material in front of the bit, the drill string 76 is advanced downward in the borehole 70—hence "sliding" downward. The path 72 of the drill bit 71 is bent at the adjustable section 75, so that while the apparatus is in "slide mode" the borehole 70 is sent off at an angle directionally as shown in FIG. 12a. This direction can be measured by a "measurement while drilling" (MWD) sensor, which is typically mounted in a known position in the drilling string near to the mud motor. The MWD sensor sends signals back up to the surface which can be read to determine the orientation of the borehole and the actual direction of movement of the drill bit.

When the apparatus is in the "rotate mode" shown in FIG. 12b, the drill rig at the surface rotates the drill string 76. This causes the outer housing of the power section 74 and of the bearing section 73 to also rotate, since these sections are rigidly attached to the drill string 76. With the entire assembly rotating, the drill bit 71 is never pointed in a single direction, so that the direction 72 of the borehole 70 being drilled continues straight ahead as shown in FIG. 12b, despite the bend of the adjustable section 75.

In the prior art there are three ways which have commonly been used to accomplish directional drilling.

Early directional drilling was accomplished by placing an offset pin in a sub located at the top of the motor. This device was called an "offset top sub." These subs allowed a user to attach and screw standard drill collars into the top of the mud motor and everything from that point up the hole would be on one common axis, which would be offset at some degree—usually between 1.5° to 5°, depending on what was called for in a particular drilling situation. However, in actual experience, it was found that with a 3.5° or higher bend machined into this top sub it was difficult to get the tool down hole due to the motor scraping on the sides of the hole. However, a large degree offset top sub was often needed to get any turn or reaction down hole out of the motor due to the fact that the distance between the bit and this machined offset top sub was sometimes in excess of 40 feet.

The next development in directional drilling was the fixed bent housing and/or "bent sub", which had a fixed bend built into the middle of the device. It was found that if an offset top sub was used in conjunction with a fixed bent housing an operator could get the desired degree of offset down hole without having all of the problems of trying to get a 5° offset top sub into the hole. Later, the fixed bent sub with a bend up to 3° would become the standard for modern day directional drilling.

One disadvantage of this type of setup, however, was the fact that the operator only had one fixed set bend to work with and, if the direction of drilling was not being changed quickly enough, it was necessary for the operator to pull the drill out of the hole and change mud motors with a fixed bent housing that was machined to a higher degree bend. This is undesirable due to the fact that a drilling operation might have up to four different bent housings screwed onto four different mud motors sitting at a drill site waiting to be used. The need for these extra fixed bent housing mud motors required for directional drilling operations increased the overall cost of the job.

In the use of a standard motor the bit is pointed by aligning the bend in the motor to the desired direction, resulting in well deviation. The deviation can only be controlled by sliding the bottom hole assembly to a maximum amount drilled. Thus the need to remove the entire assembly from the well and reinsert it back after the adjustment ("trip"), if the required bore deviation is not being accomplished.

In order to avoid having a plurality of bent subs on site, "adjustable bent subs" were developed in which the magnitude of the bend was adjustable. U.S. Pat. No. 4,077,657 to Trzecia; U.S. Pat. No. 4,813,497 to Wenzel; and U.S. Pat. No. 5,343,966 to Wenzel et al. which all disclose various types of adjustable bent housings of the type under consideration. An adjustable bent housing allowed the drill operator to set the motor to whatever degree desired on the rig floor before going into the borehole. The adjustable bent housing had a bend range from 0° or a straight motor, up to 3° of bend. With this tool, if the operator was behind the curve and consequently not building enough angle to hit the subterranean target, it was possible to pull the mud motor out of the hole, and without changing any parts, reset the degree of bend on the motor to a higher more aggressive bend.

However, the operation of pulling the mud motor out of the hole ("tripping") is time consuming and not cost productive. Often the desired adjustment needed to be made on surface will require a second trip out of the well to reset the motor setting back down to a rotatable bend in order to continue the drilling operation to the desired end of well location, thus resulting in more cost overrun as expensive tripping is not factored into budgets.

"Point the bit" is a method used in which it is proven that a well path can be controlled by pointing the bit in the desired direction you wish to steer the well path.

SUMMARY OF THE INVENTION

A bearing section for a positive displacement mud motor for directional drilling in which the deflection of the drill bit is remotely adjusted by bending the drive sub using an offset flex drive mechanism to adjust between desired settings.

The bearing section of the present invention can be used with existing power sections to address the need to trip the motor in order to increase the deflection of the drill bit. An embodiment of the present invention provides a specially designed housing that will allow directional drilling with the capability to increase the motor performance (dogleg achievable over 100' course length) and be adjustable from surface without the need for the costly budget robbing trips of the bottom hole assembly (BHA).

BRIEF DESCRIPTION OF THE DRAWING

FIG. 1 shows a side view of a first embodiment of the mud motor with the drive sub unbent so that the drill bit is aligned with the axis of the motor.

FIG. 2 shows a side view of the embodiment of FIG. 1, with the drive sub bent so that the drill bit is offset for directional drilling.

FIG. 5 shows a side view of a second embodiment of the mud motor with the drive sub unbent so that the drill bit is aligned with the axis of the motor.

FIG. 6 shows a side view of the embodiment of FIG. 5, with the drive sub bent so that the drill bit is offset for directional drilling.

FIG. 4 shows a cut-through view along lines 8-8 in FIG. 6

FIG. 12a shows a positive displacement mud motor in a borehole in "slide mode".

FIG. 12b shows a positive displacement mud motor in a borehole in "rotate mode".

DETAILED DESCRIPTION OF THE INVENTION

Figure 3:
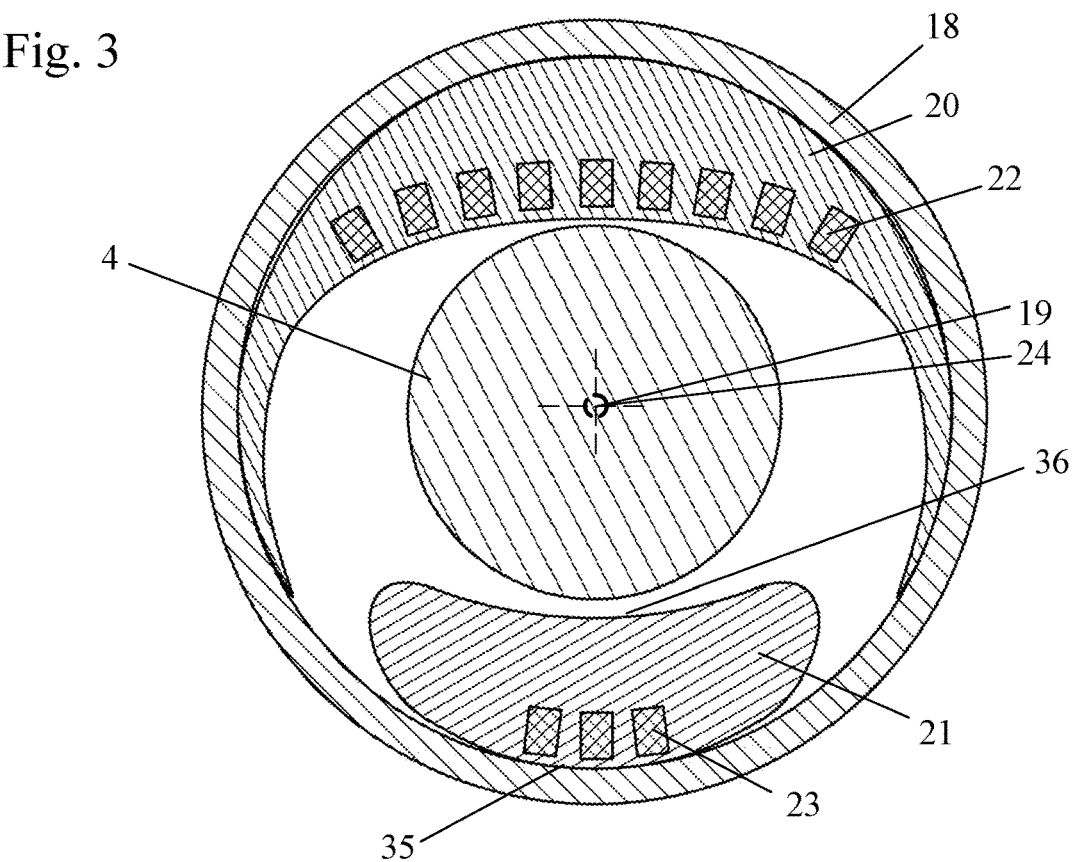
FIG. 3 shows a cut-through view along lines 3-3 in FIG. 1.

The following embodiments and aspects thereof are described and illustrated in conjunction with systems, tool and methods which are meant to be exemplary and illustrative, and not limiting in scope. In the various embodiments which follow, one or more of the above described problems have been reduced or eliminated, while other embodiments are directed to other improvements.

The present invention is a bearing section of a positive displacement mud motor (PDM). The drill string, power section and the adjustable section of the motor are conventional, as is the drill bit, and these elements of the drilling apparatus have therefore not been shown in detail in FIGS. 1-10.

The power section of the mud motor is attached to the to the bearing section, with the OD of the outer housing 18 of the bearing section remaining consistent with comparison to the rest of the mud motor's OD, while the internal components are adjustable to a second angle. Essentially, the bearing section of the invention takes the place of an otherwise ordinary lower bearing housing with no other changes to the original mud motor.

This facilitates the invention to be used on any speed or type of power section as well as any fixed or adjustable bend motor. As long as the invention is properly indexed to the motor bend, it will increase on demand the maximum performance of the regular bend housing while maintaining rotatability and adding down-hole selectivity of bit deflection.

FIGS. 1 and 2 show a side view of a first embodiment of the invention with the cylindrical outer housing 18 cut away to show the internal structure, and FIGS. 5 and 6 show the same view of a second embodiment of the invention. The first embodiment and second embodiments use different implementations of an offset flex drive mechanism for the drive sub 4, which will be discussed below. The elements which are common to both embodiments are detailed in the following discussion.

As shown in those figures, the invention has a cylindrical outer housing 18 within which the components described below are mounted. Shaft 9 leads from the rotor of the power section of the motor, as described in the background above, and universal joint 10 compensates for the bend in the adjustable section.

A flexible drive sub 4, made of a strong, flexible material such as titanium, has a first end attached to the drill bit 17 and a second end attached to the universal joint 10 on the shaft 9. A drill bit 17 which drills the well ahead of the motor is mounted on the end of drive sub 4, which is driven through the universal joint 10 by the rotation of shaft 9 powered by the rotor in the power section. Rotational force from the power section is thus transmitted to the drill bit 17 by the flexible drive sub 4. The flexible drive sub 4 is supported at the leading end of the outer housing 18 by a fulcrum bearing stack 5, and at the trailing end of the housing 18 by a load transferring bearing stack 7 which transfers the up-hole weight of the drill string to the outer housing 18, and a drive sub catcher 8.

The fulcrum bearing stack 5 is made of one or more individual bearings, which have an outer race 15a fit on the inside of the outer housing 18, an inner race 15c and a set of balls or rollers 15b between the inner race 15c and the outer race 15*a*. The drive sub 4 is formed with an arcuate section or sleeve 11 on its outer surface, which fits within a mating arcuate inside surface of the inner race 15*c* of the fulcrum bearing stack 5. The arcuate surfaces of the section or sleeve 11 and the inside of the inner race 15*c* allows the drive sub 4 to tilt within the outer housing 18, steering the drill bit 17 as will be described in greater detail below. The fulcrum bearing stack 5 allows lateral movement and transfers bit 17 load into the outer housing 18, and through the load transferring bearing stack 7 back into the up-hole shaft 9.

The load transferring bearing stack 7 is made up of one or more individual bearings, each with an outer race 14*a* fit on the inside of the outer housing 18, an inner race 14*c* fit on the outside of the drive sub 4, and a set of balls or rollers 14*b* between the inner race 14*c* and the outer race 14*a*. Similarly, the drive sub catcher 8 is made up of one or more individual bearings, each with an outer race 16*a* fit on the inside of the outer housing 18, an inner race 16*c* fit on the outside of the drive sub 4, and a set of balls or rollers 16*b* between the inner race 16*c* and the outer race 16*a*.

The remotely controlled adjustment of the bearing section of the invention is controlled by suitable control electronics 2, preferably mounted within the outer housing 18. The control electronics 2 are preferably powered by the rotation of the drive sub 4, so as to allow the motor to generate its own electrical power, thereby eliminating the need for externally-charged or replaceable batteries. This can be accomplished by providing an internal generator, as shown in the figures, by mounting a plurality of stator windings 1*a* on the inside of the outer housing 18, aligned with a plurality of permanent magnets 1*b* on the outside of the drive sub 4. The magnetic field from the magnets 1*b* causes an electrical voltage to be induced in the stator windings 1*a*. The stator windings 1*a* can be electrically coupled to a battery or capacitor stack 12 to smooth out the electrical impulses and provide short-term storage of energy for the electronics 2 when the shaft is not rotating.

A rotation sensor 3*a* is also mounted within the outer housing 18, aligned with a permanent magnet mounted on the outside of the drive sub 4. The sensor 3*a* is coupled to the control circuitry 2, so that the rotational speed of the drive sub 4 can be determined, as will be described in detail below. The magnet sensed by the rotation sensor 3*a* can be a separate permanent magnet 3*b* as shown in the figures, or the rotation sensor 3*a* could be aligned to detect the same permanent magnets 1*b* as are used to generate power as described above.

The remotely adjustable bearing section of the invention permits altering the direction of the drill bit 17 relative to the outer housing 18, thus steering the drill in the ground, by using an offset flex drive mechanism to move a central portion of the length of the drive sub 4 toward one side of the outer housing 18, thus bending the drive sub 4 and causing the rotational axis 19 of the flexible drive sub 4 to form a curve.

FIGS. 1, 3, 5 and 7 shows how the rotational axis 19 of the drive sub 4 is normally aligned with the central axis 24 of the outer housing 18 when the offset flex drive mechanism is in a neutral position. FIGS. 2, 4, 6 and 8 show how the drive sub 4 is caused to bend by the offset flex drive mechanism, so that the central axis 19 of the drive sub 4 at the lower end attached to the drill bit 17 is at an angle to the central axis 24 of the outer housing 18.

Optionally, the control circuit 2 can include a position sensor, preferably of the solid-state gyroscope type which is used in smartphones and other devices to sense rotational position. This will allow the control circuit 2 to determine if the motor is in "slide mode" as shown in FIG. 12*a*, or if it is in "rotate mode" as shown in FIG. 12*b*. If the motor is in "rotate mode", the control circuit will detect through the position sensor that the outer housing 18 is rotating. If the motor is in "slide mode", the control circuit 2 will detect that the outer housing 18 is rotationally fixed using the position sensor, and will simultaneously detect that the drive sub 4 is rotating using the rotation sensor 3*a*.

First Embodiment—Eccentric Ring Magnetic Offset Flex Drive Mechanism

FIGS. 1 through 4 show the details of the first embodiment of the invention. In this embodiment, the offset flex drive mechanism uses a fixed adjustment ring segment 20 which is fixed to the inside of the outer housing 18 at a location approximately central between the lower end adjacent to the drill bit 17 and the upper end with the drive sub catcher 8. A plurality of electromagnets 22 are embedded in an inner surface of the fixed segment 20 (the surface closer to the axis 24 of the outer housing 18). The electromagnets 22 are electrically coupled to the control circuit 2, so that the polarity of the magnetic field of the electromagnets 22 can be controlled by the control circuit 2.

Figure 4:
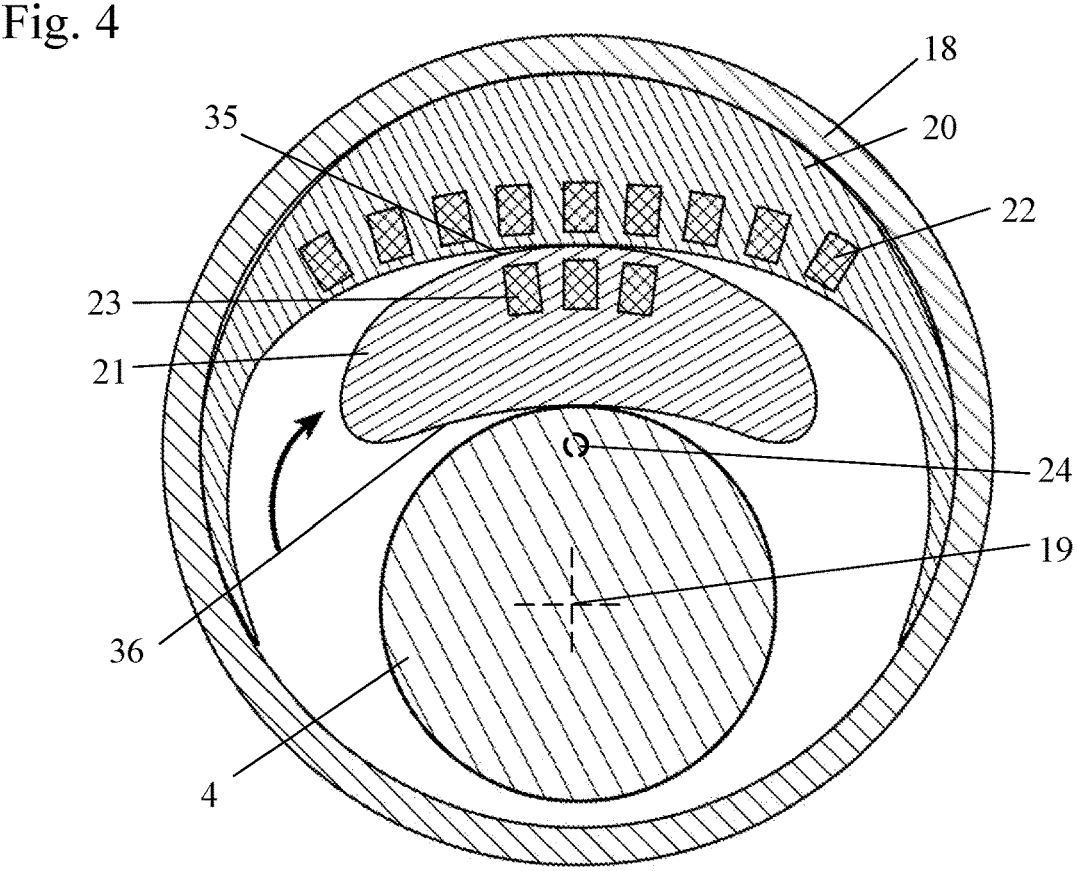
FIG. 4 shows a cut-through view along lines 4-4 in FIG. 2

A moving adjustment ring segment 21 is also located inside the outer housing 18 at a location approximately central between the lower end adjacent to the drill bit 17 and the upper end with the drive sub catcher 8. The moving adjustment ring segment 21 can move rotationally within the outer housing 18 from a neutral position to an offset position, as shown in FIGS. 3 and 4, respectively. A plurality of permanent magnets 23 are embedded in a surface 35 of the moving adjustment ring segment 21 which is adjacent to the inside surface of the outer housing 18 when the moving adjustment ring segment 21 is in the neutral position shown in FIG. 3, termed the "inner surface" herein.

When the polarity of the electromagnets 22 in the fixed adjustment ring segment 20 is set such that the pole on the inner surface of the fixed adjustment ring segment 20 is the same as the pole of the permanent magnets 23 closest to surface 35 of the moving adjustment ring segment 21, the electromagnets 22 will repel the permanent magnets 23, moving the moving adjustment ring segment 21 to the opposite side of the outer housing 18 from the fixed adjustment ring segment 20. In this neutral position, the drive sub 4 can rotate between the inner surface of the fixed adjustment ring segment 20 and surface 36 of the moving adjustment ring segment 21 without contacting either surface. The drive sub 4 is therefore unbent as shown in FIGS. 1 and 3, and the rotational axis 19 of the drive sub 4 is aligned with the central axis 24 of the central housing 18. In this position, the drill bit 17 will drill a bore which is aligned with the central housing 18.

When the polarity of the electromagnets 22 in the fixed adjustment ring segment 20 is set such that the pole on the inner surface of the fixed adjustment ring segment 20 is opposite to the pole of the permanent magnets 23 closest to surface 35 of the moving adjustment ring segment 21, the electromagnets 22 will attract the permanent magnets 23, rotationally moving the moving adjustment ring segment 21 so that surface 35 of the moving adjustment ring with the permanent magnets 23 is held against the inner surface of the fixed adjustment ring segment 20. In this position, surface 36 of the moving adjustment ring segment 21 contacts the drive sub 4 and forces it to bend to one side, so that the rotational axis 19 of the drive sub 4 at this central point is moved away from the central axis 24 of the central housing 18, as shown in FIGS. 2 and 4. In this position, the drill bit 17 will drill a bore which is angled relative to the central housing 18, and the overall drilling system will drill a curved hole.

Second Embodiment—Pinion Gear Offset Flex Drive Mechanism

FIGS. 5 through 10 show the details of the second embodiment of the invention. In this embodiment, the offset flex drive mechanism uses an adjustment gear 29 mounted within the outer housing 18 by an extension 32 fitting within an offset bore 33 in a mounting sleeve 31, which is mounted inside the outer housing 18 at a location approximately central between the lower end adjacent to the drill bit 17 and the upper end with the drive sub catcher 8. The adjustment gear 29 has an offset bore 34 through which the drive sub 4 passes.

The adjustment gear 29 can be turned by pinion gear 25. The pinion gear 25 is mounted on a shaft 26 which has a driven gear 28 on the opposite end. A driving gear 30 is fixed on the outside of the drive sub 4. The shaft 26 can be moved axially by control shaft actuator 27 under control of the control circuit 2, from the position shown in FIG. 5, where the driven gear 28 is disengaged from the driving gear 30, to the position shown in FIG. 6, where the driven gear 28 engages the driving gear 30. In the position shown in FIG. 6, the rotation of the drive sub 4 is transmitted to control shaft 26 through driving gear 30 and driven gear 28. This causes pinion gear 25 to rotate, which in turn rotates adjustment gear 29.

Figure 7:
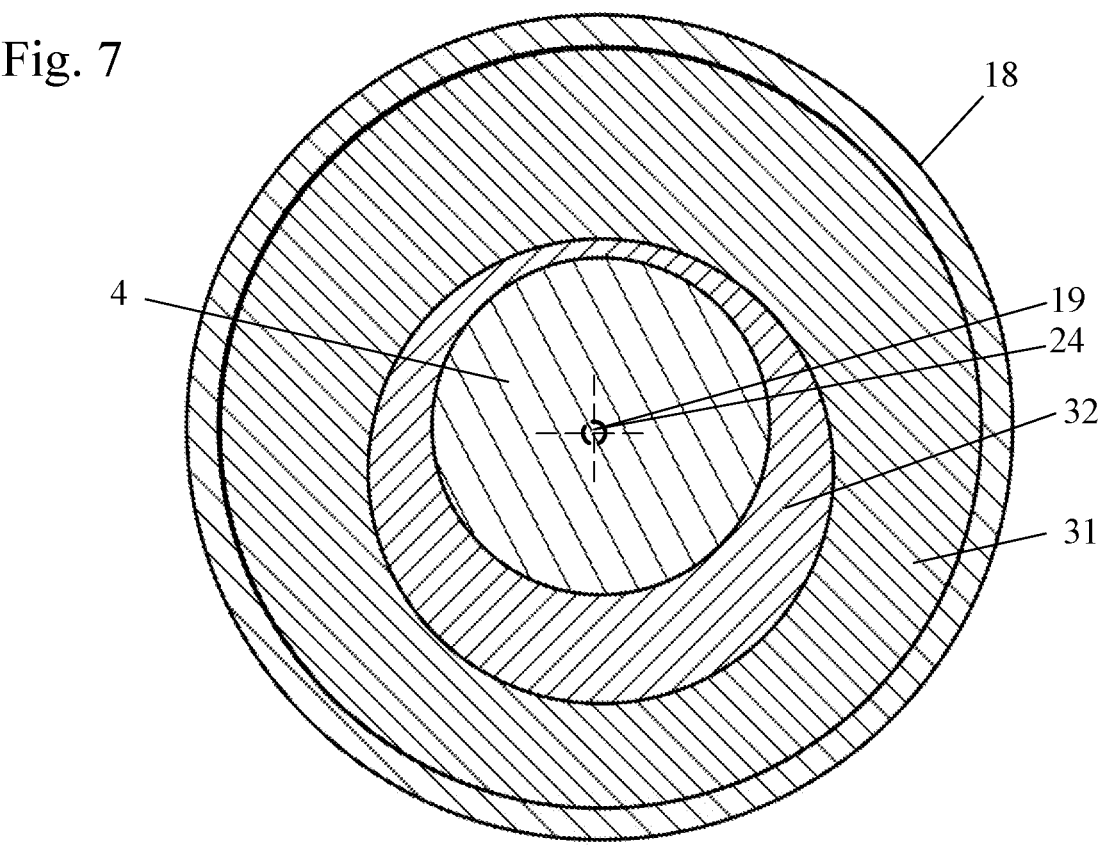
FIG. 7 shows a cut-through view along lines 7-7 in FIG. 5.
Figure 8:
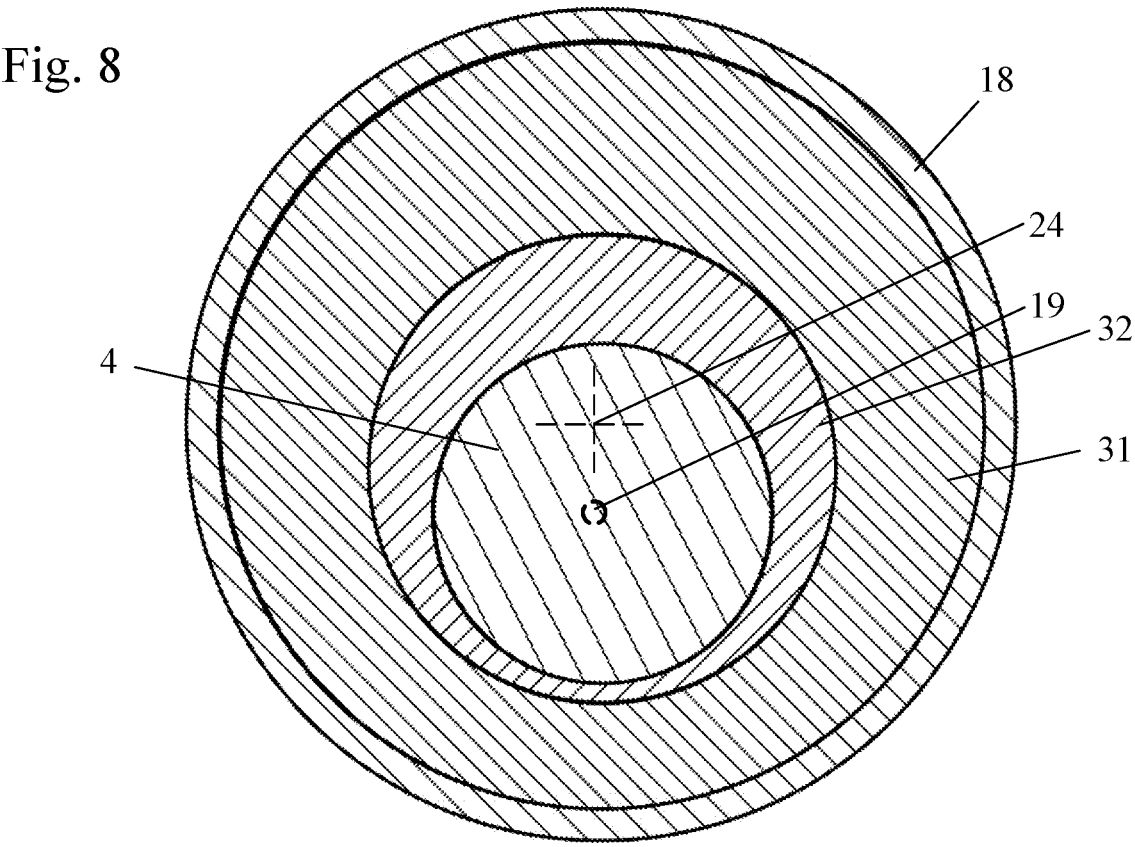

When the adjustment gear 29 is rotated, the offset bore 34 moves the drive sub 4 from the neutral position shown in FIGS. 5 and 7 to the bent position shown in FIGS. 6 and 8. In the neutral position of FIGS. 5 and 7, drive sub 4 is unbent, and the rotational axis 19 of the drive sub 4 is aligned with the central axis 24 of the central housing 18. In this position, the drill bit 17 will drill a bore which is aligned with the central housing 18. When the adjustment gear is rotated to move the offset bore 34 such that the rotational axis 19 of the drive sub 4 at this central point is moved away from the central axis 24 of the central housing 18, the offset bore 34 forces the drive sub 4 to bend to one side, as shown in FIGS. 6 and 8. In this position, the drill bit 17 will drill a bore which is angled relative to the central housing 18, and the overall drilling system will drill a curved hole.

Figure 9:
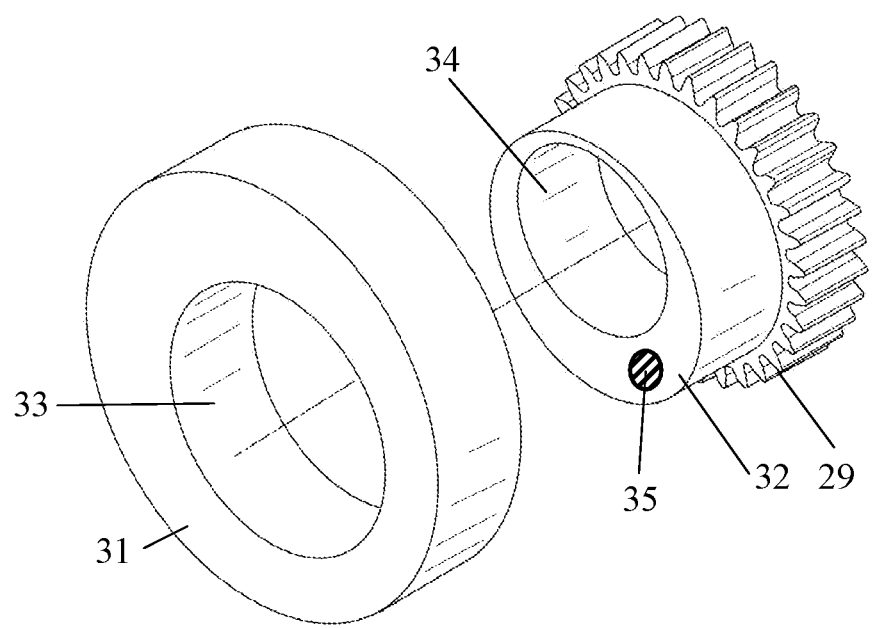
FIG. 9 shows an eccentric ring and gear for use in the second embodiment of the invention.
Figure 10:
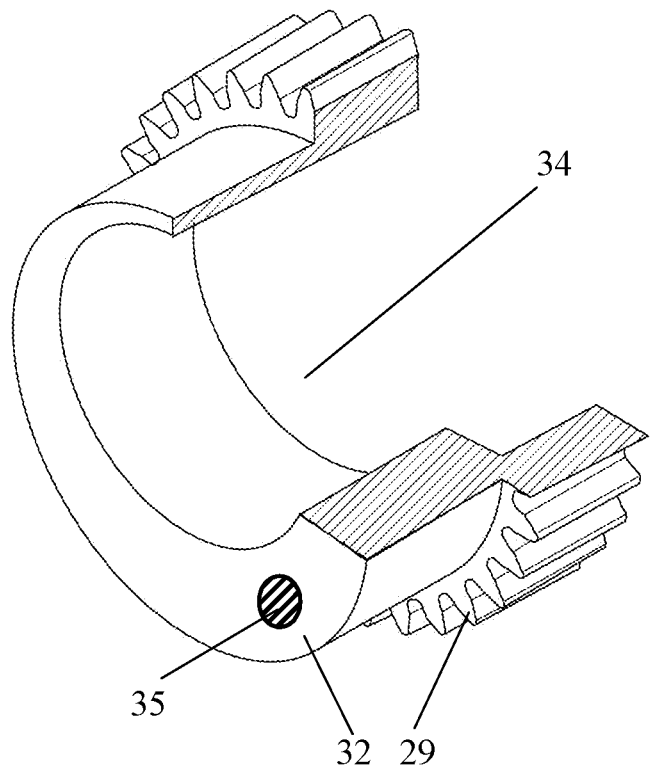
FIG. 10 shows a cut-away view of the gear from FIG. 9.

When adjustment gear 29 reaches a desired rotational position, the control circuit 2 will cause the actuator 27 to move the control shaft 26 axially to disengage the driven gear 28 from the driving gear 30, stopping the rotation of the adjustment gear 29. One or more gear position sensors 38 can be provided, mounted inside the outer housing 18 adjacent to the adjustment gear 29, to permit the control circuit 2 to determine that the adjustment gear 29 has reached one position or the other (or both). The gear position sensors 38 can be of any kind known to the art, for example Hall Effect magnetic sensors which can sense the presence of a magnetic field. A magnet 37 can be provided on or inset into the offset section 32 of the adjustment gear 29 as shown in FIGS. 9 and 10, so that when the adjustment gear 29 rotates to the neutral position shown in FIG. 5 or the bent position of FIG. 6, the gear position sensors 38 can provide a signal to the control circuit 2, which will then use the shaft actuator 27 to move the shaft 26 to disengage the driven gear 28 from driving gear 30.

Method of Operation

In a preferred method of operation, the apparatus of the present invention will use the rotation sensor 3a to read the rotational speed (RPM) of the drive sub 4 of the mud motor over a given period of time. When the rotational speed is changed in a predetermined way, the control circuit 2 will activate the offset flex drive mechanism to change between the neutral position and the bent position of the drive sub 4, thus changing the drilling angle of the drill bit 17.

Figure 11:
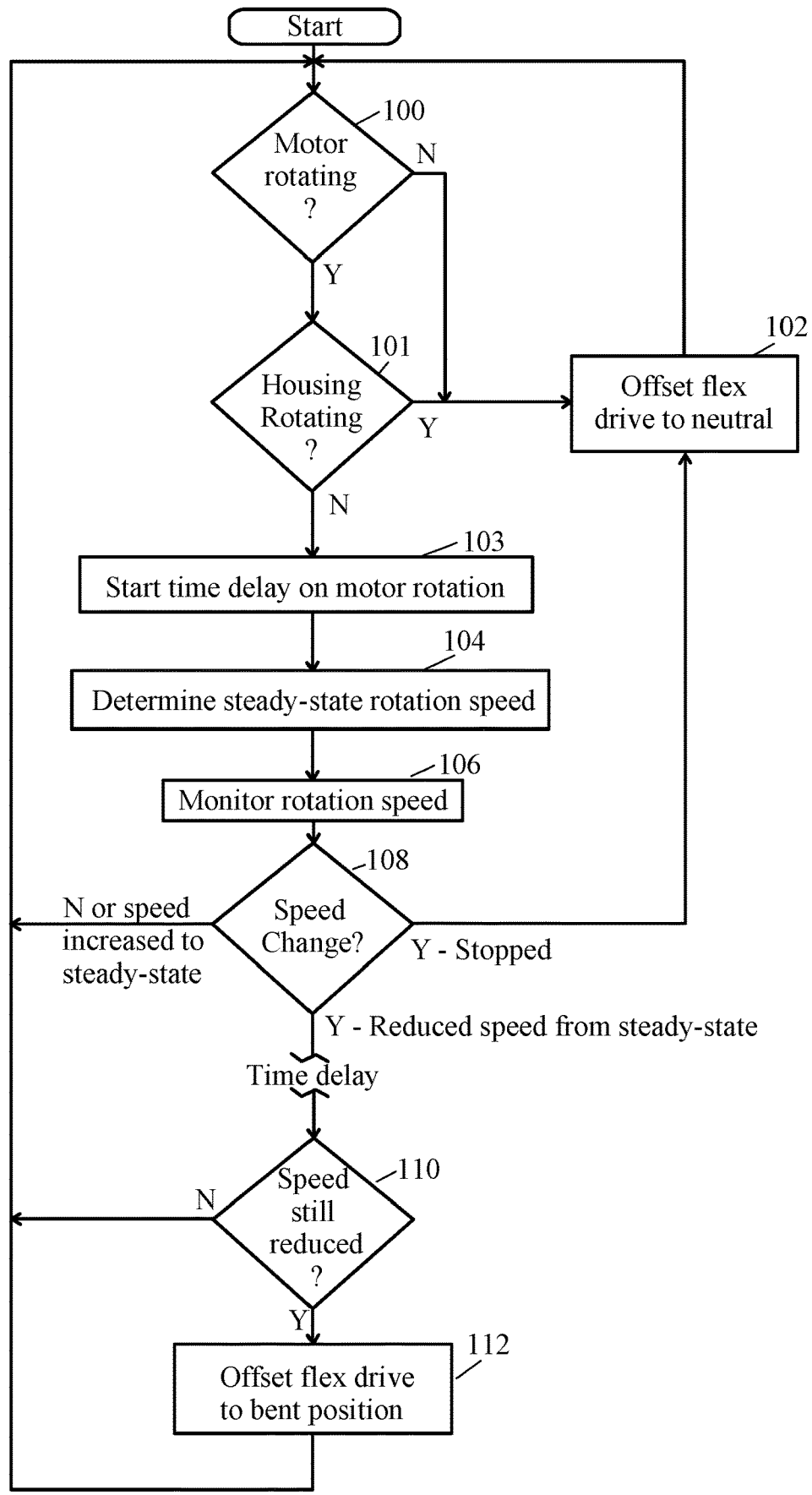
FIG. 11 shows a flowchart of a method of the invention.

The method of operation is shown in the flowchart of FIG. 11.

Step 100: If the rotational sensor 3a detects that the motor has stopped (i.e. drive sub 4 is not rotating), for example due to pumps being switched or zero flow, the method branches to step 102. If the motor has not stopped, the method continues to step 101.

Step 101: If the position sensor in the control circuit 2 detects that the outer housing 18 of the bearing section of the motor is rotating, indicating that the motor is in "rotation mode", then the method branches to step 102. If the housing 18 is not rotating, the method continues to step 103.

Step 102: Reset: the control circuit 2 commands the offset flex drive mechanism to reset to the neutral position. The method then loops back to step 100.

Step 103: Start time delay: the control circuit 2 starts a time delay (for example 60 to 90 seconds) when the rotation sensor 3a detects in step 101 that the drive sub 4 is rotating.

Step 104: Determine steady-state rotational speed: at the expiration of the time delay, using the rotational sensor 3a the control circuit 2 will determine the steady-state rotational speed (RPM) of the drive sub 4. This rotational speed is based on the flow rate of the drilling fluid (mud) through the motor, as well as external factors such as the load on the drill bit.

Step 106: Monitor rotational speed: The control circuit 2 will monitor the current rotational speed as the motor continues to drive the drill bit 17 over time.

Step 108: Did the speed change?: If there has been no change in rotational speed, defined as the rotational speed being no more than a determined amount (for example 20%-30%) below the steady-state rotational speed determined in step 104), or if the current rotational speed of the motor has increased back to the steady-state rotational speed from step 104, the method returns to step 100. If the speed has changed such that the drive sub 4 is no longer rotating (i.e. the motor has stopped), the method returns to step 102. If there is a reduction in rotational speed from the steady-state speed from step 104, of more than the determined amount (for example 20%-30%), the control circuit 2 will start another time delay (for example 60 to 90 seconds).

Step 110: If, at the end of the time delay, the rotational speed has returned to within the determined amount of the steady-state rotational speed, the method repeats from step 100. If the reduction in rotational speed is maintained at the end of the time delay, the method will take this as an indication that a change in direction is being commanded and will progress to step 112.

Step 112: Activate offset flex drive mechanism: the control circuit 2 will actuate the offset flex drive mechanism to cause the motor to change between the neutral position and the bent position. In the first embodiment of FIGS. 1-4, this would require the control circuit to change the polarity of the electromagnets 23, thereby changing the position of moving adjustment ring segment 21. In the second embodiment, this would require the control circuit 2 to command the control shaft actuator 27 to engage the driven gear 28 and driving gear 30, rotating adjustment gear 29 until the gear position sensor 38 detects that the adjustment gear 29 had reached the bent position. After the change has been made, the method returns to step 100.

The present invention will therefore be able to boost the maximum motor performance from the surface when it is required, for example during times in the well path when build rates fall below the required minimum. The present invention is also able to return the bit tilt to a hard setting that an exceptionable deflection for maximum rotation of the BHA, all without tripping at any time.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

Reference list

1a - stator windings of power generator
1b - magnets of power generator
2 - electrical control circuit
3a - rotation sensor
3b - magnet on drive sub
4 - flexible drive sub
5 - fulcrum bearing
6 - eccentric ring
7 - load transferring bearing stack
8 - drive sub catcher
9 - up-hole shaft
10 - universal drive joint
11 - arcuate sleeve on drive sub fitting in fulcrum bearing
12 - battery or capacitor stack
13 - magnet
14a - outer race of load transferring bearing
14b - rollers or balls of load transferring bearing
14c - inner race of load transferring bearing
15a - outer race of fulcrum bearing
15b - rollers or balls of fulcrum bearing
15c - inner race of fulcrum bearing
16a - outer race of drive sub catcher
16b - rollers or balls of drive sub catcher
16c - inner race of drive sub catcher
17 - drill bit mounting
18 - outer housing
19 - axis of drive sub
20 - fixed adjustment ring segment
21 - moving adjustment ring segment
22 - electromagnets
23 - permanent magnets
24 - axis of outer housing
25 - control shaft - pinion gear
26 - control shaft
27 - control shaft - actuator
28 - control shaft - driving gear
29 - adjustment drive gear
30 - driving gear on drive sub
31 - offset gear mounting sleeve
32 - adjustment gear - offset section
33 - offset bore in outer housing sleeve
34 - offset bore in adjustment gear
35 - inner surface of moving segment
36 - outer surface of moving segment
37 - magnet in adjustment gear
38 - gear position sensors

What is claimed is:

1. A bearing section for a positive displacement mud motor, comprising:
   a) an outer housing comprising a cylinder having an upper end, a lower end, an inner surface and a central axis;
   b) a fulcrum bearing stack mounted inside the outer housing adjacent the lower end, the fulcrum bearing stack having an arcuate inside surface;
   c) a load transferring bearing stack mounted inside the outer housing adjacent the upper end;
   d) a flexible drive sub comprising a first end rotationally mounted inside the outer housing by an arcuate section mating with the arcuate inside surface of the fulcrum bearing stack, a second end rotationally mounted inside the outer housing by the load transferring bearing stack, and a length having a rotational axis between the first end and the second end;
   e) an offset flex drive mechanism centrally mounted within the outer housing, having a neutral position in which the rotational axis of the flexible drive sub is aligned with the central axis of the outer housing and a bent position in which the offset flex mechanism bends a central portion of the flexible drive sub away from the central axis of the outer housing, causing the rotational axis of the flexible drive sub to form a curve such that the rotational axis of the flexible drive sub at the first end of the flexible drive sub is at an angle to the central axis of the outer housing; and
   f) a control circuit mounted within the outer housing and coupled to the offset flex drive mechanism;
   wherein the offset flex drive mechanism comprises:
      a fixed adjustment ring segment fixed to the inside of the outer housing at a location central between the lower end and the upper end;
      a plurality of electromagnets embedded in an inner surface of the fixed adjustment ring segment;
      a moving adjustment ring segment, located inside the outer housing at a location central between the lower end and the upper end;
      the moving adjustment ring segment being movable rotationally within the outer housing from a neutral position on an opposite side of the inside of the outer housing from the fixed adjustment ring segment to a bent position in which the moving adjustment ring segment is in contact with the fixed adjustment ring segment; and
      a plurality of permanent magnets embedded in a surface of the moving adjustment ring segment which is adjacent to the inside surface of the outer housing when the moving adjustment ring segment is in the neutral position and which is in contact with the fixed adjustment ring segment when the moving adjustment ring segment is in the bent position;
      wherein when the moving adjustment ring segment is in the neutral position, the drive sub rotates between the inner surface of the fixed adjustment ring segment and the moving adjustment ring segment without contacting either the fixed adjustment ring segment or the moving adjustment ring segment; and
      wherein when the moving adjustment ring segment is in the bent position, the moving adjustment ring segment contacts the flexible drive sub, bending a central portion of the flexible drive sub away from the central axis of the outer housing;
      the control circuit being electrically coupled to the plurality of electromagnets such that the polarity of the magnetic field of the plurality of electromagnets is controlled by the control circuit, so that when the polarity of the electromagnets is set such that the plurality of electromagnets attracts the plurality of permanent magnets, the moving adjustment ring segment is rotationally moved to the bent position, and when the polarity of the electromagnets is set such that the plurality of electromagnets repels the plurality of permanent magnets, the moving adjustment ring segment is rotationally moved to the neutral position.

2. The bearing section for a positive displacement mud motor of claim 1, further comprising a rotation sensor coupled to the control circuit, the rotation sensor comprising a sensor mounted on the inside of the outer housing aligned with and sensing at least one magnet mounted on the flexible drive sub.

3. The bearing section for a positive displacement mud motor of claim 1, further comprising an internal generator mounted within the outer housing and coupled to the control circuit, comprising a plurality of stator windings on the inside of the outer housing aligned with a plurality of permanent magnets mounted on the flexible drive sub.

4. The bearing section for a positive displacement mud motor of claim 1, further comprising a drive sub catcher mounted inside the outer housing adjacent the upper end.

5. The bearing section for a positive displacement mud motor of claim 1, in which the flexible drive sub is made of titanium.

6. The bearing section for a positive displacement mud motor of claim 1, further comprising a drill bit mounted on the first end of the flexible drive sub.

7. The bearing section for a positive displacement mud motor of claim 1, further comprising a universal joint mounted on the second end of the flexible drive sub.

8. A method of directing a positive displacement mud motor comprising an outer housing comprising a cylinder having an upper end, a lower end, an inner surface and a central axis; a fulcrum bearing stack mounted inside the outer housing adjacent the lower end, the fulcrum bearing stack having an arcuate inside surface; a load transferring bearing stack mounted inside the outer housing adjacent the upper end; a flexible drive sub comprising a first end rotationally mounted inside the outer housing by an arcuate section mating with the arcuate inside surface of the fulcrum bearing stack, a second end rotationally mounted inside the outer housing by the load transferring bearing stack, and a length having a rotational axis between the first end and the second end; a control circuit; a rotation sensor coupled to the control circuit, the rotation sensor comprising a sensor mounted on the inside of the outer housing aligned with and sensing at least one magnet mounted on the flexible drive sub, and an offset flex drive mechanism centrally mounted within the outer housing and coupled to the control circuit, having a neutral position in which the rotational axis of the flexible drive sub is aligned with the central axis of the outer housing and a bent position in which the offset flex mechanism bends a central portion of the flexible drive sub away from the central axis of the outer housing, causing the rotational axis of the flexible drive sub to form a curve such that the rotational axis of the flexible drive sub at the first end of the flexible drive sub is at an angle to the central axis of the outer housing; comprising the steps of:

a) the control circuit monitoring a rotational speed of the flexible drive sub using the rotational sensor;

b) when the control circuit detects a reduction in the rotational speed of the flexible drive sub of more than a determined amount, the control circuit starting a time delay; and c) at the end of the time delay, if the control circuit detects that the reduction in the rotational speed is maintained, the control circuit activating the offset flex drive mechanism to change from the neutral position to the bent position.

9. The method of directing a positive displacement mud motor of claim 8, in which the offset flex drive mechanism comprises a fixed adjustment ring segment fixed to the inside of the outer housing at a location central between the lower end and the upper end; a plurality of electromagnets embedded in an inner surface of the fixed adjustment ring segment; a moving adjustment ring segment, located inside the outer housing at a location central between the lower end and the upper end; the moving adjustment ring segment being movable rotationally within the outer housing from a neutral position on an opposite side of the inside of the outer housing from the fixed adjustment ring segment to a bent position in which the moving adjustment ring segment is in contact with the fixed adjustment ring segment; and a plurality of permanent magnets embedded in a surface of the moving adjustment ring segment which is adjacent to the inside surface of the outer housing when the moving adjustment ring segment is in the neutral position and which is in contact with the fixed adjustment ring segment when the moving adjustment ring segment is in the bent position; and the step of the control circuit activating the offset flex drive mechanism comprises the control circuit changing a polarity of the plurality of electromagnets.

10. The method of directing a positive displacement mud motor of claim 8, in which the offset flex drive mechanism comprises an adjustment gear mounted within the outer housing by an extension fitting within an offset bore in a mounting sleeve mounted inside the outer housing at a location central between the lower end and the upper end, the adjustment gear having an offset bore through which the flexible drive sub passes; a pinion gear rotationally coupled to the adjustment gear, mounted on a shaft with a driven gear on an opposite end from the pinion gear; a driving gear fixed on an outside of the flexible drive sub; and a control shaft actuator coupled to the control circuit for axially moving the shaft from a position where the driven gear is disengaged from the driving gear to a position where the driven gear engages the driving gear; and the step of the control circuit activating the offset flex drive mechanism comprises the control circuit causing the control shaft actuator to axially move the control shaft to engage the driven gear and the driving gear for a time sufficient to change between the neutral position and the bent position.

11. The method of directing a positive displacement mud motor of claim 8, in which the time delay is in a range of 60 to 90 seconds.

12. The method of directing a positive displacement mud motor of claim 8, in which the reduction in rotational speed is at least 20%.

13. The method of directing a positive displacement mud motor of claim 8, in which when the control circuit detects using the rotation sensor that the flexible drive shaft has stopped rotating, the control circuit activating the offset flex drive mechanism to change from the bent position to the neutral position.

14. The method of directing a positive displacement mud motor of claim 8, in which the motor further comprises a position sensor mounted on the outside housing for sensing a rotational position of the outside housing, and the method further comprises when the control circuit detects using the position sensor that the outside housing is rotating, the control circuit activating the offset flex drive mechanism to change from the bent position to the neutral position.

15. A bearing section for a positive displacement mud motor, comprising:
   a) an outer housing comprising a cylinder having an upper end, a lower end, an inner surface and a central axis;
   b) a fulcrum bearing stack mounted inside the outer housing adjacent the lower end, the fulcrum bearing stack having an arcuate inside surface;
   c) a load transferring bearing stack mounted inside the outer housing adjacent the upper end;
   d) a flexible drive sub comprising a first end rotationally mounted inside the outer housing by an arcuate section mating with the arcuate inside surface of the fulcrum bearing stack, a second end rotationally mounted inside the outer housing by the load transferring bearing stack, and a length having a rotational axis between the first end and the second end;
   e) an offset flex drive mechanism centrally mounted within the outer housing, having a neutral position in which the rotational axis of the flexible drive sub is aligned with the central axis of the outer housing and a bent position in which the offset flex mechanism bends a central portion of the flexible drive sub away from the central axis of the outer housing, causing the rotational axis of the flexible drive sub to form a curve such that the rotational axis of the flexible drive sub at the first end of the flexible drive sub is at an angle to the central axis of the outer housing; and
   f) a control circuit mounted within the outer housing and coupled to the offset flex drive mechanism;
   wherein the offset flex drive mechanism comprises:
      an adjustment gear mounted within the outer housing by an extension fitting within an offset bore in a mounting sleeve mounted inside the outer housing at a location central between the lower end and the upper end, the adjustment gear having an offset bore through which the flexible drive sub passes;
      a pinion gear rotationally coupled to the adjustment gear, mounted on a shaft with a driven gear on an opposite end from the pinion gear;
      a driving gear fixed on an outside of the flexible drive sub; and
      a control shaft actuator coupled to the control circuit for axially moving the shaft from a position where the driven gear is disengaged from the driving gear to a position where the driven gear engages the driving gear;
      wherein when the adjustment gear is rotated, the offset bore moves the flexible drive sub from a neutral position in which the rotational axis of the flexible drive sub is aligned with the central axis of the central housing to a bent position in which the rotational axis of the flexible drive sub at a central point is moved away from the central axis of the central housing.

16. The bearing section for a positive displacement mud motor of claim 15, further comprising a gear position sensor coupled to the control circuit and mounted inside the outside housing adjacent to the adjustment gear, for sensing a rotational position of the adjustment gear.

* * * * *